United States Patent

[11] 3,623,816

| [72] | Inventor | William H. Slavik<br>Oak Lawn, Ill. |
|---|---|---|
| [21] | Appl. No. | 800,581 |
| [22] | Filed | Feb. 19, 1969 |
| [45] | Patented | Nov. 30, 1971 |
| [73] | Assignee | Motorola, Inc.<br>Franklin Park, Ill. |

[54] SYSTEM FOR MEASUREMENT OF RELATIVE COLOR INTENSITIES
6 Claims, 2 Drawing Figs.

[52] U.S. Cl. ................................................. 356/176,
356/177, 356/186, 356/222, 356/226
[51] Int. Cl. ........................................................ G01j 3/46,
G01j 3/48, G01j 1/42
[50] Field of Search............................................. 356/176,
177, 186–195, 222, 226

[56] References Cited
UNITED STATES PATENTS

| 1,812,764 | 6/1931 | Story, Jr. ........................ | 356/222 X |
| Re. 20823 | 8/1938 | Goodwin, Jr. ................. | 356/222 |
| 2,241,557 | 5/1941 | Nichols ......................... | 356/222 X |
| 2,661,650 | 12/1953 | Duntley ......................... | 356/222 |
| 2,722,156 | 11/1955 | Warren ......................... | 356/222 X |
| 3,306,156 | 2/1967 | Glasser et al. ................. | 356/178 X |
| 3,330,904 | 7/1967 | Gebel ............................ | 356/177 UX |
| 3,413,464 | 11/1968 | Kamentsky ................... | 356/178 X |
| 3,464,773 | 9/1969 | Waz .............................. | 356/226 X |
| 3,486,821 | 12/1969 | Westhaver .................... | 356/226 X |
| 2,237,950 | 4/1941 | Pineo ............................ | 250/210 X |
| 2,506,384 | 5/1950 | Rich .............................. | 250/210 X |
| 2,817,764 | 12/1957 | Jacobs et al. ................. | 250/210 X |
| 3,040,179 | 6/1962 | Bolt ............................... | 250/210 X |
| 3,159,024 | 12/1964 | Tsien ............................ | 250/210 UX |
| 3,160,759 | 12/1964 | Ward ............................ | 250/210 X |

FOREIGN PATENTS

| 853,216 | 8/1952 | Germany ....................... | 356/222 |

Primary Examiner—William L. Sikes
Assistant Examiner—Warren A. Sklar
Attorney—Mueller and Aichele ABSTRACT: A portable meter for tracking any two colors of light emitted from a color cathode-ray tube at all brightness settings includes first and second light-dependent resistors connected in two arms of a bridge circuit in series with one another across a source of DC voltage with the other two arms of the bridge circuit consisting of equal resistors connected in parallel across the light-dependent resistors. The tap of a potentiometer connected between the light-dependent resistors and the tap of a potentiometer connected between the resistors to opposite sides of a DC meter through insulated gate field effect transistors. Light impinging upon each of the light-dependent resistors is passed through a color and a neutral density filter, permitting light of only one color to strike the associated resistor. Provision is made for adjustment of the bridge balance through the potentiometers for conditions of high light, low light and, through an additional arm of the bridge for darkness; so that the meter output is accurate over a wide range of brightness conditions.

PATENTED NOV 30 1971    3,623,816

INVENTOR.
WILLIAM H. SLAVIK

BY Mueller, Aichele & Rauner

ATTORNEYS.

SYSTEM FOR MEASUREMENT OF RELATIVE COLOR INTENSITIES

BACKGROUND OF THE INVENTION

In the cathode-ray tubes presently employed in conjunction with color television receivers, the phosphors on the cathode-ray tube screens are arranged in triads of phosphor dots of three primary colors, such as red, green and blue, with each particular color being caused to fluoresce or emit light under the control of the output of an associated gun in the cathode-ray tube. Variations in the alignment of the guns and in the adjustment of the deflection yokes can cause inaccurate tracking of the guns resulting in inaccurate color reproduction on the screen of the cathode-ray tube, so that it is desirable to provide a means of measuring the tracking of the guns of such a cathode-ray tube by the color temperatures of the fluorescence of the phosphors on the screen.

Because it is difficult for a human observer to accurately estimate the color uniformity or nonuniformity of the colors reproduced on a cathode-ray tube at different brightness settings, and also because it is difficult for a human observer to judge acceptable purity of a white field, meters for comparing the color temperature of two or more colors have been provided in order to obtain more accurate information regarding the tracking of the guns of such color cathode-ray tubes. In such meters, bridge sensing circuits have been employed, using a pair of light-dependent resistors or photosensitive devices in two arms of the bridge and using resistors in the other two arms of the bridge. A suitable meter then is connected across the diagonal of the bridge formed between the junction of the light-dependent resistors and the junction of the fixed resistors in the circuit. This type of circuit, however, operates satisfactorily only in the region where the resistances of the light-dependent resistors approximate the resistances of the fixed resistors in the circuit and is subject to a substantial loss of sensitivity whenever the light-dependent resistors are operated at low light or high light conditions. This is due to the fact that for low light conditions, the resistances of the light-dependent resistors are extremely high; so that any variations in the relative resistance of these resistors has little affect on the output sensed by the meter. Likewise, when the light-dependent resistors are subjected to high light conditions, their resistance is substantially lower than the resistance of the fixed resistors in such a bridge circuit, again resulting in a substantial loss of sensitivity of the circuit.

This loss of sensitivity has been corrected by replacing the fixed resistors in the other two arms of the bridge with variable resistances; but when this is done careful rebalancing of the bridge is necessary for each of the different ranges of light intensity in which the bridge circuit is to be operated.

SUMMARY OF THE INVENTION

It is an object of this invention to provide an improved detector for comparing the intensities of light from two sources over a wide range of brightness.

It is another object of this invention to provide a color tracking meter in which a null detector operates over a relatively narrow voltage range with a wide range of brightness conditions of the colors being tracked.

It is an additional object of the present invention to provide an improved detector for testing the color uniformity of the screen of the cathode-ray tube.

It is a further object of the present invention to provide an improved apparatus for deriving a substantially instantaneous determination of the relative color temperatures of two colors over the surface of a cathode-ray tube phosphor screen.

In accordance with a preferred embodiment of this invention, a tracking meter is provided for tracking two sources of light and includes a bridge circuit having first and second light dependent resistors connected in series across a source of DC potential in parallel with first and second resistors of substantially equal resistance. Each of the light-dependent resistors is illuminated with light from one of the two sources, and the junction between the light-dependent resistors is connected to one terminal of an indicating device and the junction between the resistors is connected to the other terminal of the indicating device. The bridge initially is balanced; and whenever variations in the relative intensities of the light impinging upon the light-dependent resistors occurs, an unbalance of the bridge exists and is detected by the indicating device which provides an indication of the relative amount and direction of the bridge unbalance.

DETAILED DESCRIPTION

Figure 1:
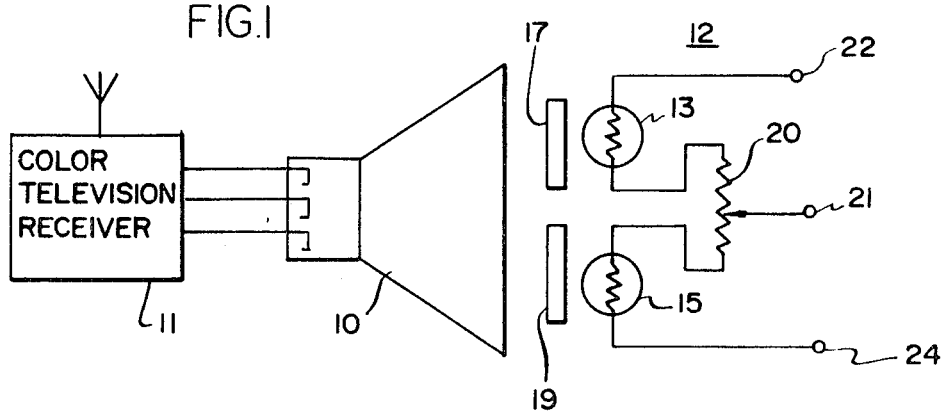
FIG. 1 is a partial schematic diagram of a device for testing the color tracking on a cathode-ray tube screen.

Referring now to FIG. 1, there is shown a color tracking meter in accordance with a preferred embodiment of this invention for ascertaining the amount of tracking between two colors reproduced on the phosphor screen of a cathode-ray tube 10, which is supplied with color television signals from a color television receiver circuit 11. Since the operation of the color tracking meter of this invention does not depend upon any particular type of circuitry for creating the electron beams in the cathode-ray tube 10 to cause the color reproduction on the screen, the details of the color television receiver 11 have not been provided. For the purposes of this invention, it is sufficient to note that the three outputs of the color television receiver 11 may be applied to the cathodes of the three guns associated with each of the three primary colors which are reproduced on the screen of the cathode-ray tube 10.

In order to detect the tracking of two of these three colors with respect to one another over the face of the phosphor screen of the cathode-ray tube 10, a portable color tracking meter 12 is provided and includes a pair of light-dependent resistors 13 and 15, each being responsive to the light passing through a neutral density and a color filter 17 and 19, respectively, with the filters 17 and 19 each passing light of a different color to the respective one of the light-dependent resistors 13 and 15. The neutral density filter is adjusted so that light from a properly tracked CRT makes the two light-dependent resistors 13 and 15 equal in resistance. The light-dependent resistors 13 and 15 are connected in series with one another through a potentiometer 20, the tap of which is connected to an output terminal 21, with the other terminals of the light-dependent resistors 13 and 15 being connected respectively to a pair of terminals 22 and 24.

Figure 2:
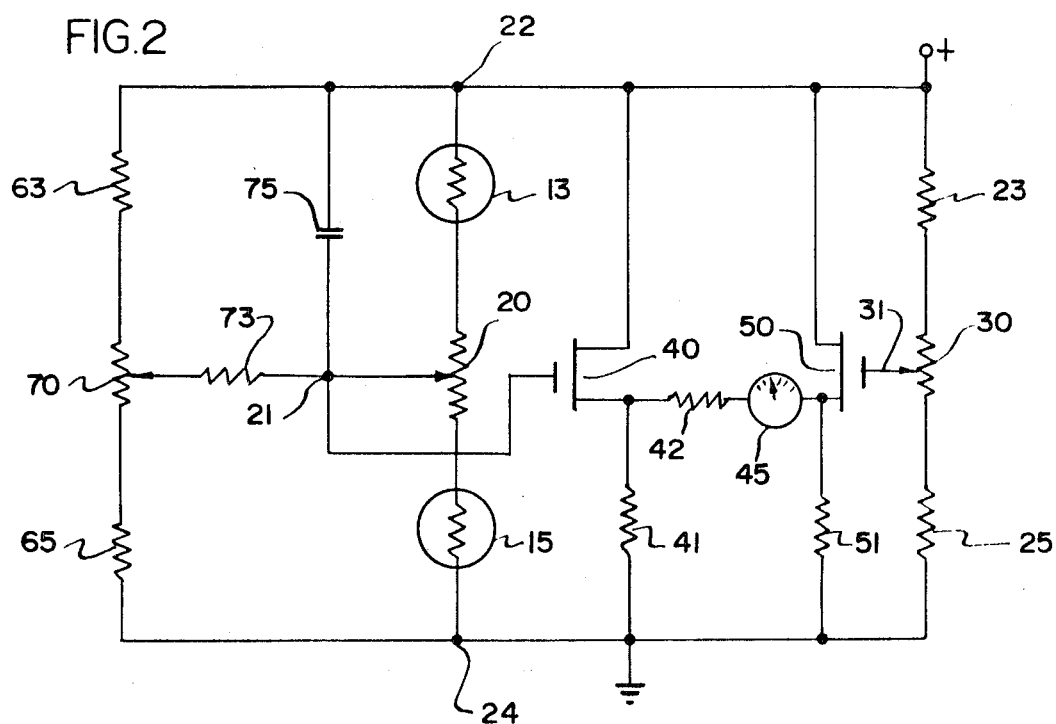
FIG. 2 is a schematic diagram of a meter circuit used in conjunction with the device shown in FIG. 1.

Referring now to FIG. 2, there is shown a cathode-ray tube color tracking meter in the form of a null detector for utilizing the relative differences in the impedances of the light-dependent resistors 13 and 15, when illuminated by different amounts of light, to provide an indication of the relative differences of the color temperatures of the phosphors on a cathode-ray tube providing the two colors of light used to illuminate the light-dependent resistors 13 and 15. The resistors 13 and 15 are connected in series with one another through a potentiometer 20, with the terminals 22 and 24 being connected to a source of positive DC potential and ground, respectively.

In order to utilize the light-dependent resistors 13 and 15 in a null detector, an additional pair of equal resistors 23 and 25 are connected in series with a second potentiometer 30 between the source of positive potential and ground to form an additional two arms of a bridge circuit, the other two arms of which include the light-dependent resistors 13 and 15, respectively. The tap output 21 is connected to the gate of a first insulated gate field effect transistor, the source of which is connected to the source of positive potential and the drain of which is connected through a drain resistor 41 to ground. In a like manner, the tap output of the potentiometer 30 is connected to the base of a second insulated gate field-effect transistor 50, the source of which is connected to the source of positive potential and the drain of which is connected through a drain resistor 51 to ground. The drain of the field-effect transistor 40 then is also connected through a resistor 42 to one input terminal of a null detector meter 45, the other input terminal of which is connected to the drain of the transistor 50.

In this manner, the null detector 45 is connected across the diagonal of the bridge formed by the light-dependent resistors 13 and 15 and the fixed resistors 23 and 25, with the junctions of the diagonal being connected to the taps 21 and 31 respectively on the potentiometers 20 and 30. When the amount of light impinging upon the light-dependent resistors 13 and 15 is equal with the center taps 21 and 31 being connected to the centers or balance points of the potentiometers 20 and 30, the potential available at each of the center taps is one-half that of the source, so that zero voltage exists across the diagonal and the amplified inputs to the two terminals of the null indicator meter 45 are equal. Thus, the meter 45 indicates a null which is indicative of this balanced condition.

As soon as a variation in the amount of light impinging upon the light-dependent resistors 13 and 15 takes place, the relative resistance of these resistors changes, causing a corresponding difference or shift in the potential at the terminal 21 as compared with the balance potential which continues to be applied to the terminal 31. This difference then is amplified by the high impedance input field-effect transistor 40 to provide an amplified voltage indication to the left-hand input to the meter 45 which then indicates the direction and relative amount of the difference of the voltage drops across the light-dependent resistors 13 and 15.

It should be noted that whether or not the light-dependent resistors are being operated in a condition of relatively low light or a condition of relatively high light, the range of voltages over which the meter 45 must operate is a relatively narrow range near one-half the positive source potential and controlled by the relative differences in the impedances of the light-dependent resistors 13 and 15. This is to be contrasted with the wide voltage range which would be applied to the meter terminals if the diagonal of the bridge were such that the junctions between the fixed resistors and the light-dependent resistors were the junctions of the diagonal of the bridge. A bridge connected in this latter manner would be subject to a wide variation of voltages across the meter 45 and would lack sensitivity at high light and low light conditions, since the ratio of the relative impedances of the resistors on both sides of such a junction would vary widely. In the circuit shown in FIG. 2, this ratio varies only over a very limited range.

It has been found that the dark resistances of light-dependent resistors of the type which may be employed for the resistors 13 and 15 vary enough from resistor to resistor to cause the meter 45 to read off-scale when the color tracking meter circuit is placed in darkness. In order to overcome this problem and to cause the meter to read a null or in center scale when the light-dependent resistances 13 and 15 both are subjected to darkness, a third resistance path is connected in parallel with the two arms of the bridge between the terminals 22 and 24. This third path consists of a pair of equal resistors 63 and 65 connected in series with a potentiometer 70. The resistors 63 and 65 are chosen to be substantially equal in resistance to the resistors 23 and 25, and the potentiometer 70 is chosen to have a resistance comparable to the resistance of the potentiometer 30. The tap of the potentiometer 70 is connected through a high impedance resistor 73 to the tap 21 and to the gate of the field effect transistor 40. With the light-dependent resistors 13 and 15 in darkness, the resistance of both of these resistors is extremely high compared to the total resistance of the potentiometer 20 so that the setting of the potentiometer 20 has little effect on the potential appearing at the junction 21. In this condition, the resistance of the resistor 73 appears relatively small compared to the resistances of the light-dependent resistors 13 and 15; so that by adjustment of the tap of the potentiometer 70, the input to the gate of the field-effect transistor 40 can be changed until the meter 45 reads a null condition. Once this initial adjustment is made, the tap of the potentiometer 70 is left in this position during the remainder of the operation of the meter circuit.

It also has been discovered that some minor variations in the resistances of the light-dependent resistors 13 and 15 occur for high light and low light conditions, so that the potentiometers 20 and 30 may be adjusted to provide null reading indications when equal amounts of light are impinging upon the resistors 13 and 15 for these high and low light conditions. For high light conditions, the resistance of the potentiometer 20 is significant compared to the resistance of the resistors 13 and 15 so that the tap on the potentiometer 20 may be adjusted to provide a null. The resistance of the resistor 73 is relatively high in this condition of operation and isolates the circuit of the resistors 63, 65 and potentiometer 70 from the tap 21. For low light conditions, the resistances of the light-dependent resistors 13 and 15 are low relative to resistor 73, thereby isolating the potentiometer 70, but are high relative to the total resistance of the potentiometer 20 so that only the potentiometer 30 is significant in adjusting the balance of the bridge for low light conditions other than darkness. Once these critical adjustments have been made, the settings of the potentiometers 20, 30 and 70 remain unchanged throughout the duration of operation of the circuit. These initial settings, however, minimize erroneous indications of the meter 45 over the wide range of brightness conditions under which the circuit may be operated.

It also should be noted that in the event unequal amounts of light from the two sources are to cause a null indication to be read, such as for example, when the amount of light impinging on the resistor 13 is purposely desired to have a predetermined offset from the amount of light impinging on the resistor 15 throughout a predetermined range, the potentiometers 20 and 30 may be adjusted to provide the desired amount of offset which, if the proper offset exists, provides a null reading in the meter 45. Another method of obtaining such an offset while providing a null reading in the meter 45 is to utilize neutral density filters to pass different amounts of light to the light-dependent resistors 13 and 15. For example, such filters can be used to attenuate or reduce the amount of light impinging upon one of the resistors by the amount of the desired offset. Whether or not an offset is used, however, the meter is operated in the same manner and provides a stable operation over the entire brightness range to which the light-dependent resistors 13 and 15 are subjected, without any additional switches being required in the circuit and without necessitating the use of a meter which can operate over a wide range of voltages. As a result, the sensitivity of the meter 45 remains relatively constant over the entire range of brightness conditions to which the meter is subjected.

Although the foregoing description has been provided in conjunction with a meter for obtaining readings of the relative tracking between two different colors produced on the face of a cathode-ray tube, it is clear that any two of the three or more colors which may be produced on the screen of a cathode-ray tube may be tracked by such a meter. By comparing different groups of two of the total number of colors which can be produced on the cathode-ray tube screen, indications of the tracking of each of the colors with one another can be obtained. If it is desired to compare more than just two of the total number of colors, various conventional means for changing the filters 17 and 19 or for providing different combinations of filters and light-dependent resistors to be switched in place of the light-dependent resistors 13 or 15 can be provided. Whether or not this is done, the manner of comparing any two of the colors with a bridge circuit of the type shown in FIG. 2 remains the same.

Since the tracking meter is used to compare color tracking on a cathode-ray tube screen, it is possible for the operation of the meter to be adversely affected by electrostatic pickup of the horizontal deflection signals. To prevent this from occurring, a filter capacitor 75 is connected between the tap 21 and the terminal 22 to filter out signals at the horizontal deflection frequency. When the tracking meter is used in other environments not subject to signals of this type, the capacitor 75 may be eliminated.

I claim:

1. A system for testing the fluorescent screen of a cathode-ray tube for color tracking of two different color phosphors including in combination:

first and second potentiometers each having a tap for providing an output therefrom;

first and second substantially identical light-dependent resistors connected in series with and separated by said first potentiometer;

first and second substantially equal resistors connected in series with and separated by said second potentiometer and connected in parallel with said series-connected light-dependent resistors and first potentiometer;

means for subjecting the first and second light-dependent resistors simultaneously to light of different wavelengths emanating from the fluorescent screen of the cathode-ray tube;

first and second field-effect transistors each having at least a gate electrode and an output electrode, with the gate of said first field-effect transistor connected to the tap of said first potentiometer and the gate of said second field-effect transistor connected to the tap of said second potentiometer, said field-effect transistors exhibiting high impedance to signals appearing at the gates thereof; and a DC measuring device connected between the outputs of said first and second field-effect transistors.

2. The combination according to claim 1 further including third and fourth resistors of substantially equal value connected in series with and separated by, an additional potentiometer, all connected in parallel with the first and second light-dependent resistors and first potentiometer, with the tap of the additional potentiometer being connected to the gate of the first field-effect transistor through an impedance which is high relative to the impedances of the light-dependent resistors when light impinges thereon and which is low relative to the dark impedances of the light-dependent resistors.

3. The combination according to claim 2 wherein the field-effect transistors are insulated gate field-effect transistors.

4. A system for indicating the color tracking of two different light sources of different colors having a bridge circuit including in combination:

first and second DC supply terminals;

first and second light-dependent resistors connected in series with and separated by a first potentiometer and connected between the first and second supply terminals;

third and fourth impedances of substantially equal value connected in series with one another and separated by a second potentiometer and connected in parallel with the first and second light-dependent resistors and the first potentiometer;

fifth and sixth substantially equal impedances connected in series with and separated by a third potentiometer and connected in parallel with the first and second light-dependent resistors and the first potentiometer;

a seventh impedance interconnecting the taps of the first and third potentiometers, the resistance of the seventh impedance being high relative to the resistances of the light-dependent resistors when light impinges thereon and being low relative to the dark resistances of the light-dependent resistors; and a DC measuring device connected between the tap of the first potentiometer and the tap of the second potentiometer.

5. The combination according to claim 4 further including first and second high impedance amplifying devices wherein the measuring device is connected to the taps of the first and second potentiometers through the first and second high input impedance amplifying devices, respectively.

6. The combination according to claim 4 wherein the total resistance of the first potentiometer is low compared to the resistances of the light dependent resistors for dark and low light conditions and is relatively high compared to the resistances of the light-dependent resistors for high light conditions, and wherein the resistance of the second potentiometer is approximately the same as the resistance of one of the third and fourth impedances and wherein the resistance of the third potentiometer is approximately equal to the resistance of one of the fifth and sixth impedances, so that for conditions of low light the balance of the bridge may be adjusted with the second potentiometer, for darkness conditions the balance of the bridge may be adjusted by the third potentiometer, and for high light conditions the balance of the bridge may be adjusted by the first potentiometer in order to obtain initial balance of the bridge for three points over the brightness range of its operation.

* * * * *